United States Patent [19]
Murakami

[11] Patent Number: 5,216,346
[45] Date of Patent: Jun. 1, 1993

[54] WAVEFORM PROCESSING CIRCUIT FOR PULSE GENERATOR

[75] Inventor: Atsushi Murakami, Nagoya, Japan

[73] Assignee: Brother Kogyo Kabushiki Kaisha, Aichi, Japan

[21] Appl. No.: 834,627

[22] Filed: Feb. 12, 1992

[30] Foreign Application Priority Data

Feb. 13, 1991 [JP] Japan .................................. 3-019905

[51] Int. Cl.$^5$ .............................................. G01D 5/26
[52] U.S. Cl. .................................... 318/603; 318/606; 318/696; 318/602
[58] Field of Search ............................ 318/560-636, 318/138, 254, 800-820, 696; 388/801, 804, 811, 819, 828, 831, 907.5

[56] References Cited

U.S. PATENT DOCUMENTS

| | | |
|---|---|---|
| 3,781,615 | 12/1973 | Mokrytzki et al. ................. 318/801 |
| 4,376,262 | 3/1983 | Okuda et al. ........................ 318/696 |
| 4,482,850 | 11/1984 | Sonoda et al. ...................... 318/606 |
| 4,542,327 | 9/1985 | Sakano ................................. 318/571 |
| 4,591,969 | 5/1986 | Bloom et al. ........................ 318/603 |
| 5,006,772 | 4/1991 | Danby ................................. 318/696 |

Primary Examiner—Paul Ip
Attorney, Agent, or Firm—Kane, Dalsimer, Sullivan, Kurucz, Levy, Eisele and Richard

[57] ABSTRACT

A waveform processing circuit for a pulse generator provided between the pulse generator and a motor control circuit, comprises a frequency dividing circuit and a control signal generation circuit. The frequency dividing circuit outputs, on the basis of an A-phase pulse signal and a B-phase pulse signal outputted from the pulse generator, a pulse signal having a duty ratio of 1:1 and being inverted in response to rise of the A-phase pulse signal and a pulse signal having a duty ratio of 1:1 and being inverted in response to fall of the A-phase pulse. The control signal generation circuit generates, on the basis of these two pulse signals, a traveling amount signal and a direction discrimination signal. Thus, the motor control circuit carries out, on the basis of the traveling amount signal and the direction discrimination signal, motor control without undergoing the influence of a duty ratio of the pulse generated from the pulse generator.

4 Claims, 5 Drawing Sheets

WAVEFORM PROCESSING CIRCUIT FOR PULSE GENERATOR

BACKGROUND OF THE INVENTION

This invention relates to a circuit for applying waveform processing to a pulse signal outputted from a pulse generator.

A conventional waveform processing circuit for a pulse generator to output a pulse signal in accordance with movement or traveling of an object to be detected generates a direction discrimination signal and a traveling amount signal for controlling position and traveling speed of a carriage, etc. provided in a motor or a printer. Particularly, in a dot matrix printer, etc., this traveling amount signal is used as a print timing signal.

The configuration of a motor drive system for controlling a rotational speed of a motor provided in a dot matrix printer is shown in FIG. 1. In FIG. 1, a waveform processing circuit PGHS for a pulse generator is provided between a pulse generator PG and a motor control circuit MDRC. Further, FIG. 2 shows signal waveforms of respective components shown in FIG. 1 in the case where the motor DCM continuously rotates in a predetermined direction (in a clockwise direction).

The pulse generator PG outputs an A-phase pulse signal E1 and a B-phase pulse signal E2 having the same period T1 and a phase difference therebetween, in accordance with the rotation of the motor DCM.

The waveform processing circuit PGHS generates a traveling amount signal INT and a direction discrimination signal DIR on the basis of the A-phase pulse signal E1, the B-phase pulse signal E2, and an inverting signal VACK outputted from the motor control circuit MDRC. The traveling amount signal INT is outputted as a signal of Low level for a time period from the time point when the inverting signal VACK is inverted until the A-phase pulse signal E1 is inverted. One pulse of the traveling amount signal INT corresponds to a unit rotational angle of the motor DCM. For a time period during which the INT signal is at High (H) level, a printing signal for a printer, etc, is outputted. It is to be noted that the pulse width where the INT signal is at H level is dependent upon the processing time such as a printing signal output processing, etc. of the motor control circuit MDRC. Further, the direction discrimination signal DIR indicates the rotation direction of the motor DCM, and the time period during which the traveling amount signal INT is at H level is considered to be valid or effective. Namely, assuming that, e.g., the direction discrimination signal DIR is indicative of a counter-clockwise direction at H level and indicative of a clock wise direction at Low (L) level, it is indicated that the motor DCM continuously rotates in a rotation direction (in a clockwise direction in this case) indicated by the direction discrimination signal DIR for a time period during which the traveling amount signal INT is at H level.

The motor control circuit MDRC is supplied with a traveling amount signal INT and a direction discrimination signal DIR from the waveform processing circuit PGHS to execute a processing to increase or decrease the rotational speed of the motor DCM every time the traveling amount signal INT rises, and to output an inverting signal VACK which is inverted when that processing is completed in CPU and a next traveling amount signal INT is permitted to be inputted.

However, in the conventional waveform processing circuit PGHS, as seen from the timing chart of FIG. 2, there arises a problem that in the case where a ratio between H level and L level of the A-phase pulse signal E1 (hereinafter referred to as a duty cycle) is not 1:1, the traveling amount signal INT is not outputted at a timing of a fixed period, even if the rotational speed of the motor is constant.

Accordingly, in order to use the traveling amount signal INT as a reference signal for the speed control and the printing control, a pulse generator having a duty cycle extremely close to 1:1 is required, so the pulse generator is required to have high accuracy. Thus, the cost is disadvantageously increased.

In order to eliminate the above drawback, since the period of an output signal of the above mentioned pulse generator is generally stable, it is conceivable to take a measure in processing on the motor control circuit side to carry out the speed control and the printing control every other time when the traveling amount signal INT rises to H level, i.e., to carry out the speed control and the print control and to output an inverted signal VACK when a traveling amount signal is given first; and to only output the inverting signal VACK when a traveling amount signal INT is given secondly. However, even in such a case, since an unnecessary traveling amount signal INT (i.e., the second traveling amount signal described above) is inputted to the motor control circuit, in the case where the rotational speed of the motor becomes high as shown in FIG. 3, the processing ability of the motor control circuit MDRC fails to follow that situation. As a result, an erroneous operation such that the A-phase pulse signal would change before the inverting signal VAC is inverted may take place, so the direction discrimination signal DIR is inverted (period P of FIG. 3) although the rotational direction of the motor does not change.

SUMMARY OF THE INVENTION

It is an object of the present invention to provide a waveform processing circuit for a pulse generator capable of outputting a traveling amount signal without undergoing the influence of the duty cycle of an A-phase pulse signal.

According to one aspect of this invention, there is provided a waveform processing circuit for a pulse generator provided, within a moving object control apparatus, together with a pulse generator for outputting an A-phase pulse signal and a B-phase pulse signal having a same period and a phase difference therebetween, in accordance with traveling movement of an object to be detected, and a control circuit supplied with a direction discrimination signal indicating a traveling direction of the object and a traveling amount signal corresponding to a unit traveling amount of the object so as to execute a control including outputting an inverting signal which is inverted when the traveling amount signal is permitted to be inputted; wherein said waveform processing circuit is provided between said pulse generator and said control circuit to generate and output the traveling amount signal and the direction discrimination signal to said control circuit on the basis of a relationship in level between the inverting signal outputted from said control circuit and the A-phase pulse signal outputted from said pulse generator, said waveform processing circuit comprising: a frequency dividing circuit for generating a pulse signal synchronous with the A-phase pulse signal and having a duty cycle of 1:1, and a control signal generation circuit for generating the traveling amount signal and the direction discrimination signal on the basis of the pulse signal.

In accordance with this invention, the trigger signal generation circuit generates a first trigger signal having trigger pulses in response to rise and fall of the A-phase pulse signal E1. The trigger mask circuit generates, on the basis of the first trigger signal, a second trigger signal having the same period as that of the A-phase pulse signal and trigger pulses in response to rise of the A-phase pulse signal, and a third trigger signal of the same period as that of the A-phase pulse signal and trigger pulses in response to fall of the A-phase pulse signal. The flip-flop circuit generates, from the second trigger signal, a first pulse signal having a period twice greater than that of the A-phase pulse signal and inverting in response to rise of the A-phase pulse signal, and generates, from the third trigger signal, a second pulse signal having a period twice greater than that of the A-phase pulse signal and inverting in response to fall of the A-phase pulse signal.

In the case where the rotational speed of the motor is constant, these first and second pulse signals are signals having a duty cycle of 1:1. The waveform processing circuit generates a traveling amount signal and a direction discrimination signal on the basis of these signals.

As a result, in accordance with this invention, since a traveling amount signal inverting in synchronism with one period of the A-phase pulse signal, it does not undergo the influence of the duty cycle of an output signal from the pulse generator. Accordingly, an inexpensive pulse generator can be used, and it becomes possible to eliminate the possibility that any erroneous operation may take place.

DESCRIPTION OF THE PREFERRED EMBODIMENT

A preferred embodiment of this invention will now be described with reference to the attached drawings.

Figure 1:
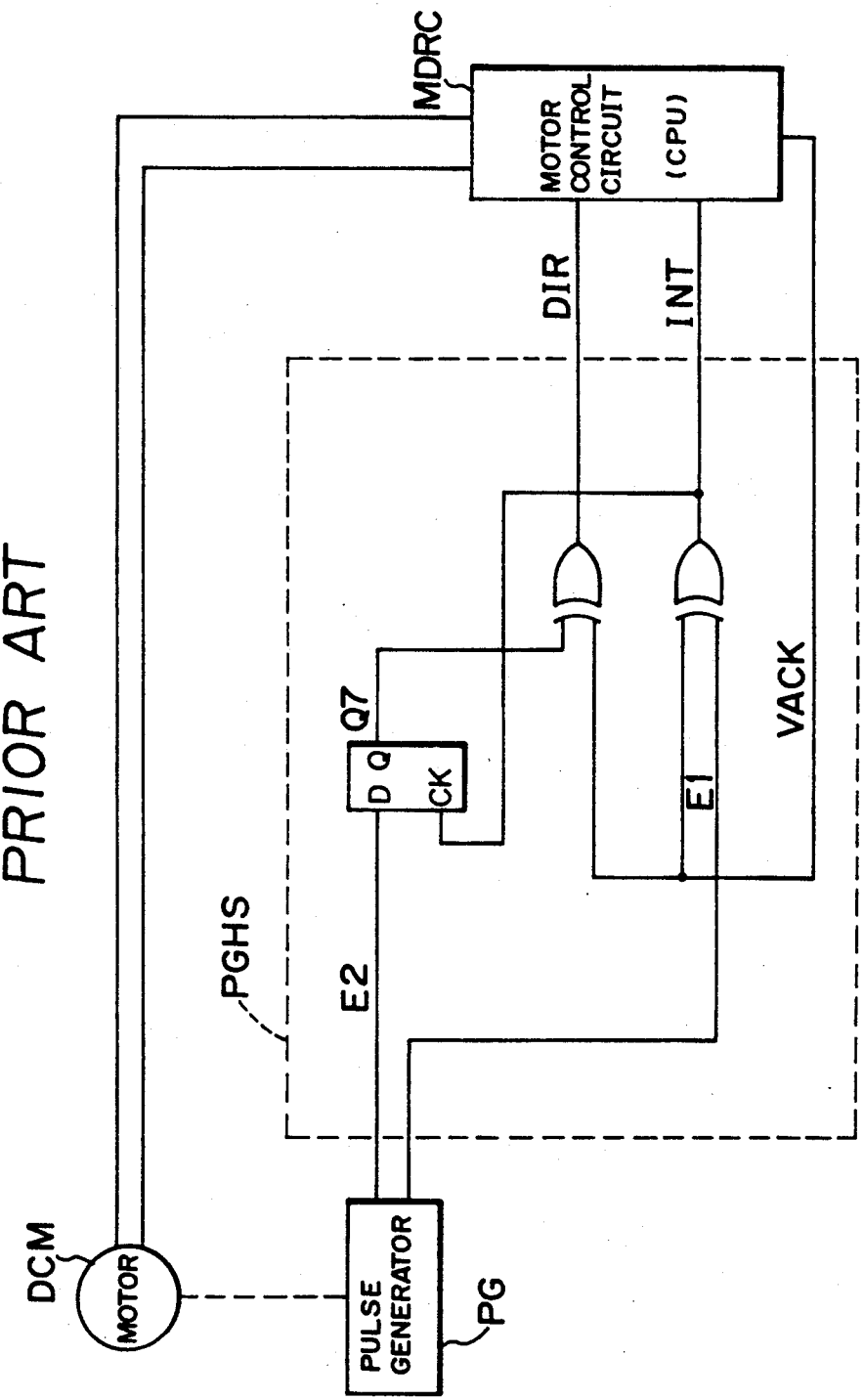
FIG. 1 is a diagram showing the configuration of a conventional motor drive system.
Figure 2:
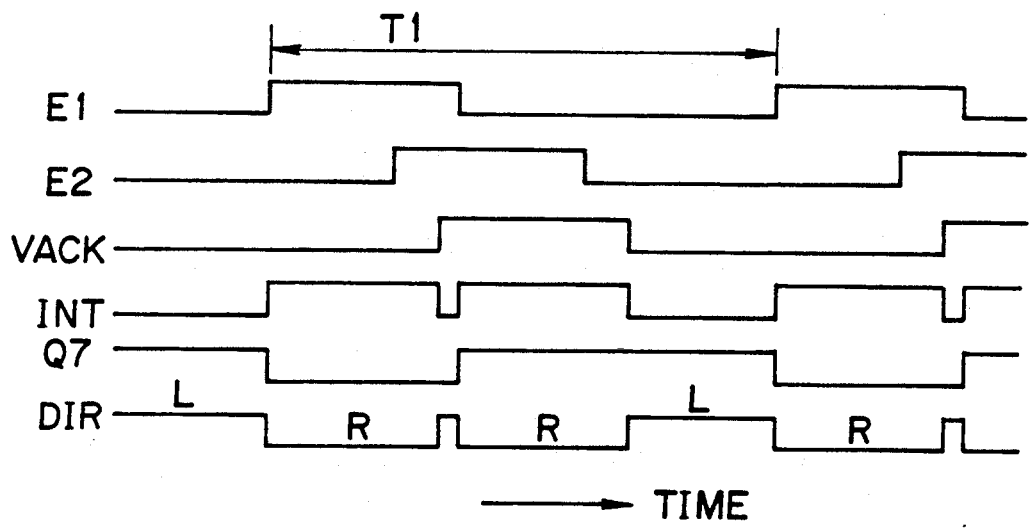
FIG. 2 is a diagram showing waveforms of respective components in a conventional waveform processing circuit.
Figure 3:
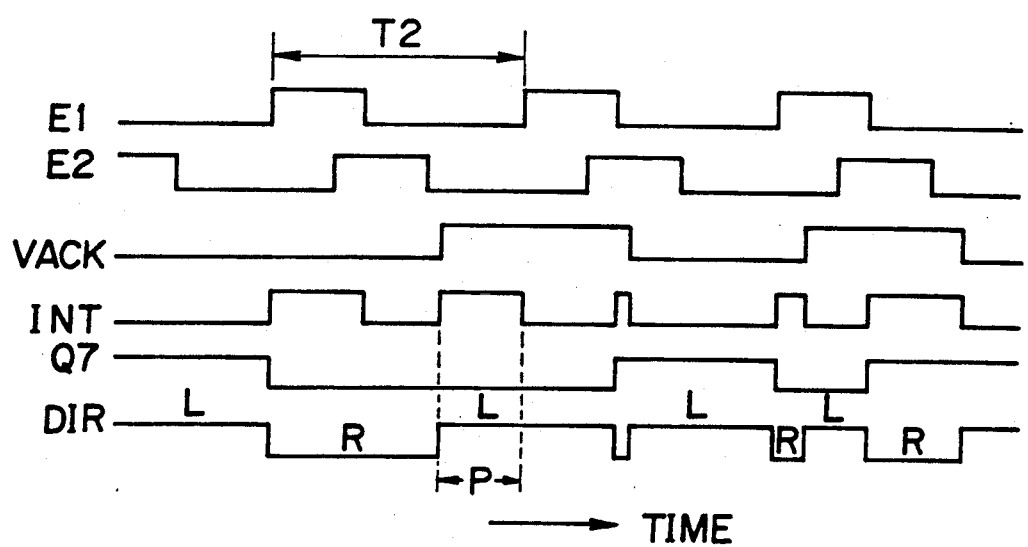
FIG. 3 is a diagram showing other waveforms of respective components in the conventional waveform processing circuit.
Figure 4:
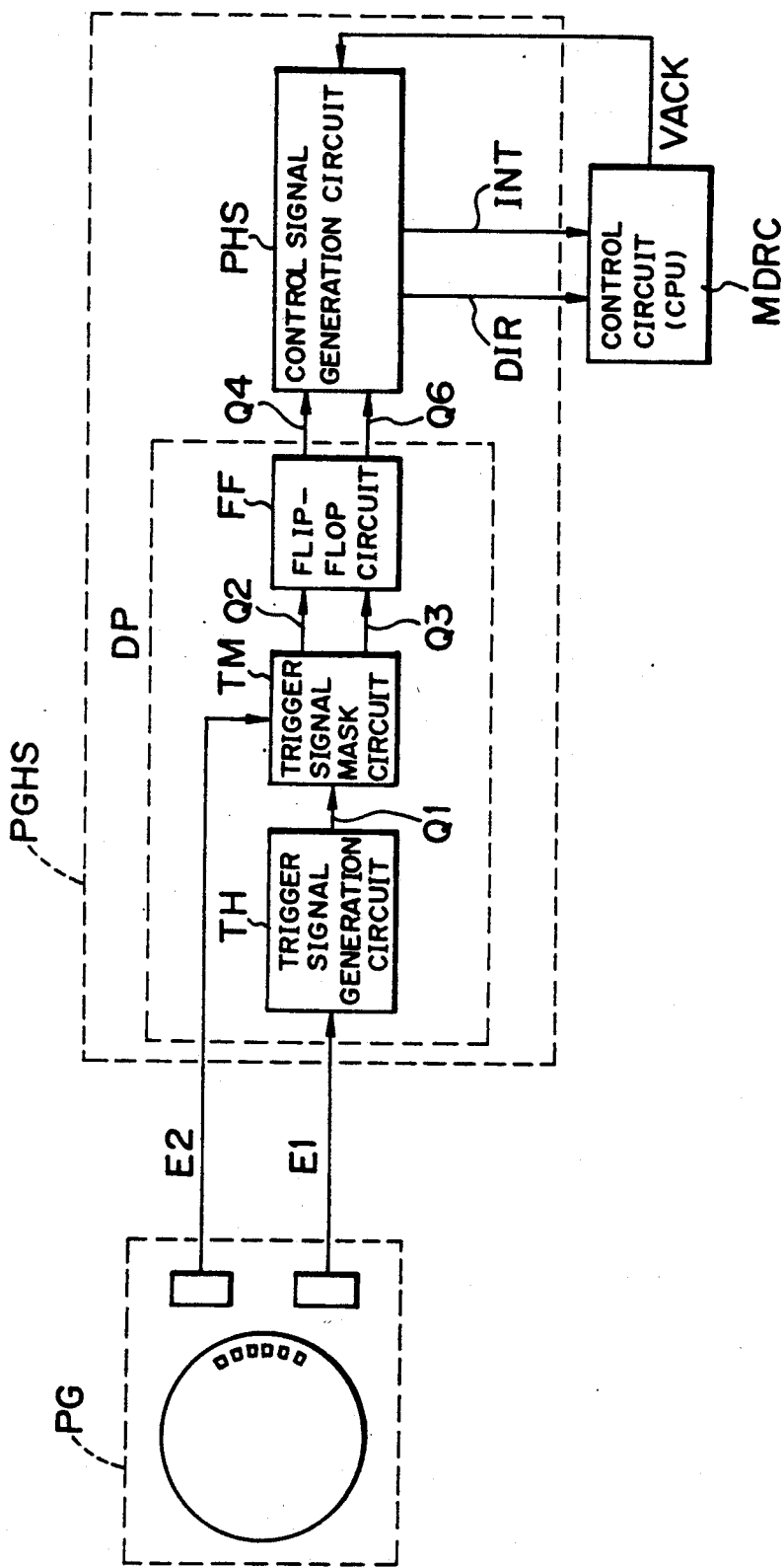
FIG. 4 is a block diagram showing the configuration of a motor drive system according to this invention.
Figure 5:
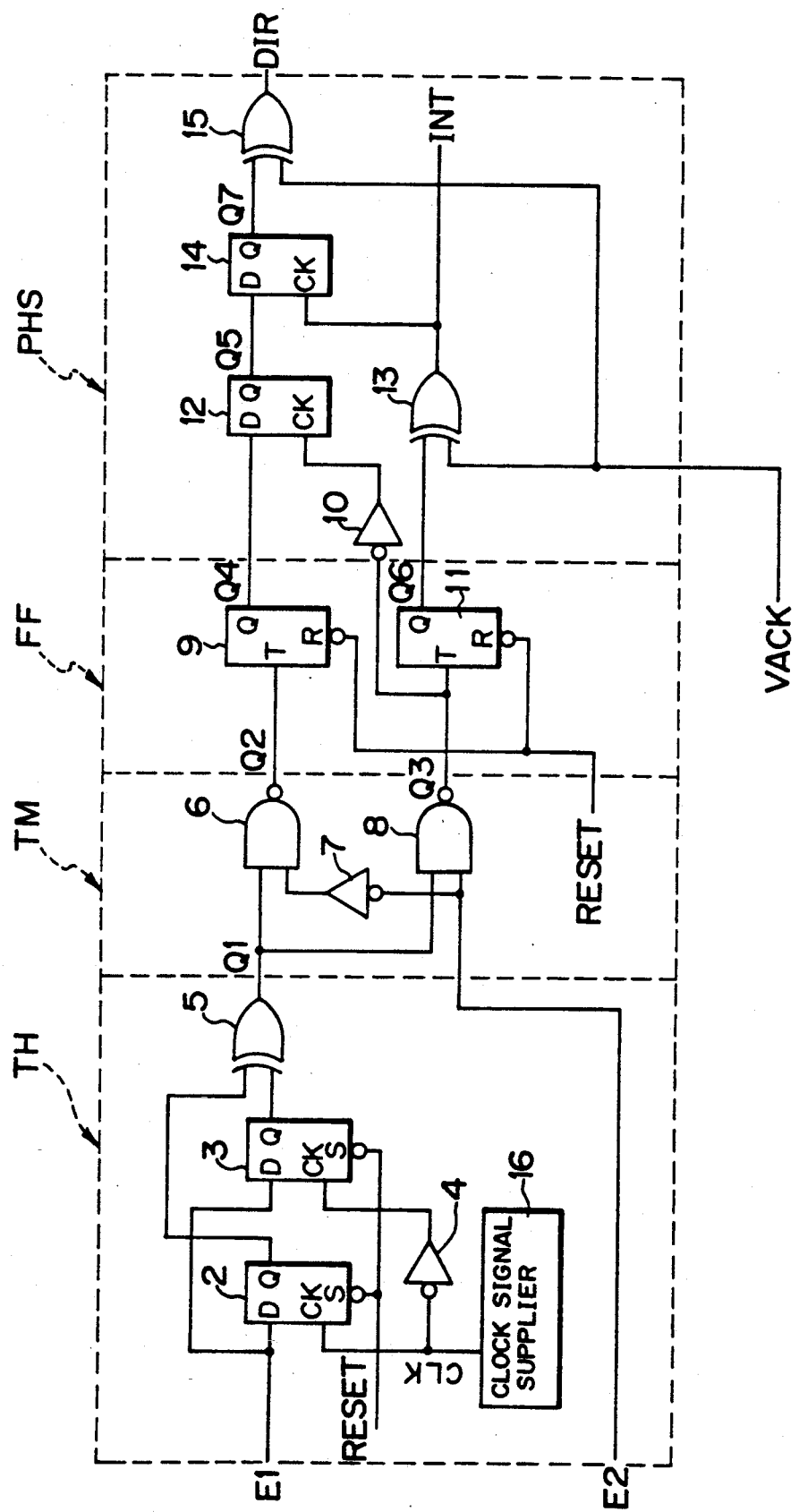
FIG. 5 is a circuit diagram showing a waveform processing circuit according to this invention.

FIG. 4 is a block diagram showing the configuration of a waveform processing circuit for a pulse generator according to the present invention. As shown in FIG. 5, the waveform processing circuit PGHS comprises a trigger signal generation circuit TH, a trigger signal mask circuit TM, a flip-flop circuit FF and a control signal generation circuit PHS. This waveform processing circuit PGHS is used in place of the waveform processing circuit PGHS shown in FIG. 1. An A-phase pulse signal E1 and a B-phase pulse signal E2 outputted from a pulse generator PG, and an inverting signal VACK from the motor control circuit MDRC are inputted to this circuit to output a direction discrimination signal DIR and a traveling amount signal INT to the motor control circuit MDRC.

The trigger signal generation circuit TH comprises D-type flip-flop circuits 2 and 3, a clock signal supplier 16, an inverter circuit 4, and an exclusive OR circuit 5.

In the D-type flip-flop circuits 2 and 3, a clock signal CLK outputted from the clock signal supplier 16 is used as the operating clock. This clock signal is inputted to the D-type flip-flop circuit 2 as it is, and is inputted to the D-type flip-flop circuit 3 through the inverter 4.

Figure 6:
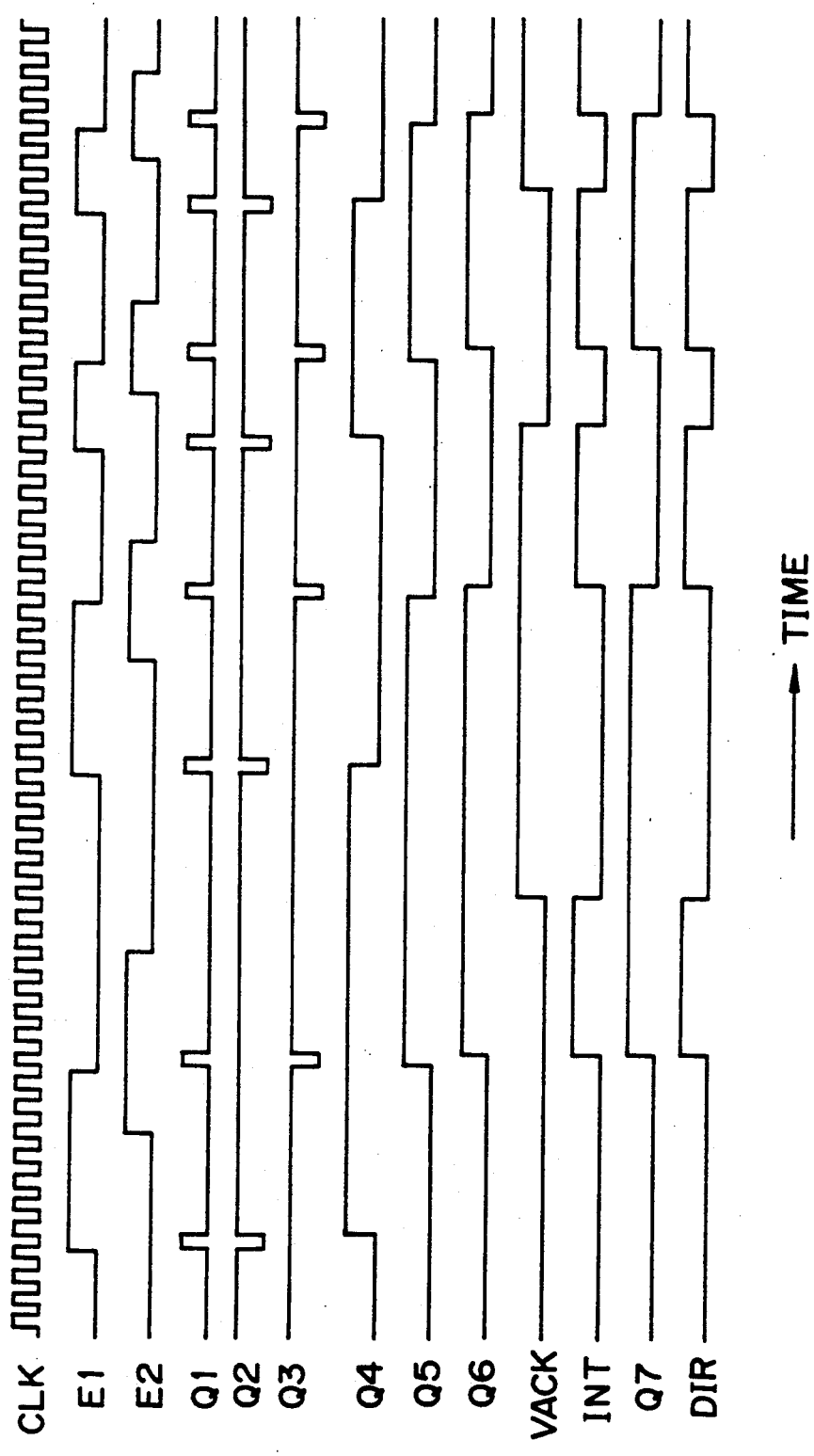
FIG. 6 is a diagrams showing respective components in a waveform processing circuit according to this invention.

Thus, A-phase pulse signals E1 inputted to the D terminals of the D-type flip-flop circuits 2 and 3 are outputted from the output terminals Q of the D-type flip-flop circuits 2 and 3 with a time delay corresponding to a half period of the clock signal CLK therebetween. Thus, respective outputs from the D-type flip-flop circuits 2 and 3 are inputted to the exclusive OR circuit 5. As a result, a first trigger signal Q1 from the exclusive OR circuit 5 serves as trigger signals outputted at both rise and fall edges of the A-phase pulse signal E1 as shown in FIG. 6.

The trigger signal mask circuit TM comprises NAND circuits 6 and 8, and an inverter circuit 7. The first trigger signal Q1 is inputted to the NAND circuits 6 and 8. Further, the B-phase pulse signal E2 is inputted to the NAND circuit 6 through the inverter circuit 7, and is inputted to the NAND circuit 8 as it is. As a result, when the B-phase pulse signal E2 is at L level, a second trigger signal Q2 is outputted, while when that pulse signal is at H level, a third trigger signal Q3 is outputted, as shown in FIG. 6.

The flip-flop circuit FF comprises T-type flip-flops 9 and 11.

The second trigger signal Q2 is inputted to the T-type flip-flop circuit 9 to generate a first pulse signal Q4. Further, the third trigger signal Q3 is inputted to the T-type flip-flop circuit 11 to generate a second pulse signal Q6.

This flip-flop circuit FF generates first and second pulse signals Q4 and Q6 having a period twice greater than that of the A-phase pulse signal and a duty cycle of 1:1 from the A-phase and B-phase pulse signals E1 and E2. The trigger signal generation circuit TH, the trigger signal mask circuit TM and the flip-flop circuit FF constitute a frequency dividing circuit DP as a whole.

The control signal generation circuit PHS comprises D-type flip-flop circuits 12 and 14, exclusive OR circuits 13 and 15, and an inverter circuit 10.

The third trigger signal Q3 is inputted to the D-type flip-flop circuit 12 through the inverter circuit 10 as a clock signal. The first pulse signal Q4 is inputted to the D terminal of the D-type flip-flop circuit 12. This flip-flop circuit 12 generates a third pulse signal Q5 keeping the level of the first pulse signal Q4 immediately before the second pulse signal Q6 is inverted, as shown in FIG. 6.

The exclusive OR circuit 13 provides, as a traveling amount signal INT, a signal indicative of exclusuve OR of the second pulse signal Q6 and the inverting signal VACK. Namely, as shown in FIG. 6, the traveling amount signal INT is at L level only for a time period during which the second pulse signal Q6 and the inverting signal VACK are at the same level.

This traveling amount signal INT is applied to the motor control circuit MDRC, and is inputted as a clock signal to the D-type flip-flop circuit 14. The D-type flip-flop circuit 14 outputs the level of the third pulse signal Q5 as an output signal Q7 in response to rise of the traveling amount signal INT.

The exclusive OR circuit 15 provides, as a direction discriminatin signal DIR, a signal indicative of exclusive OR of the output signal Q7 and the inverting signal VACK. Namely, as shown in FIG. 6, the traveling amount signal INT is at L level only for a time period during which the output signal Q7 and the inverting signal VACK are at the same level.

As described above, the waveform processing circuit PGHS for a pulse generator generates, from the A-phase pulse signal E1 and the B-phase pulse signal E2, pulse signals Q4 and Q6 having a period twice greater than that of the A-phase pulse signal and a duty cycle of 1:1 to output a traveling amount signal INT and a direction discrimination signal DIR from the above pulse signals and the inverting signal VACK. As a result, the traveling amount signal INT outputted in this case becomes a signal synchronous with one period of the A-phase pulse signal as shown in FIG. 6, and does not undergo the influence of the duty cycle of the A-phase pulse signal. Accordingly, there is no possibility of erroneous operation such that the processing ability of the motor control circuit MDRC does not follow a signal change when the motor rotates at a high speed, and that the direction discrimination signal DIR may be inverted although the rotational direction of the motor is not changed.

The invention may be embodied in other specific forms without departing from the spirit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A waveform processing circuit for a moving object control apparatus, said apparatus including:
    a pulse generator for outputting, in accordance with movement of an object to be detected, an A-phase pulse signal and a B-phase pulse signal, said pulse signals having a same period and a phase difference therebetween;
    a control circuit adapted to receive input signals indicative of a travel direction and a travel amount of said object and to output a control signal including an inverting signal which is inverted when said travel amount signal is inputted;
    said waveform processing circuit being provided between said pulse generator and said control circuit and generating said travel direction and travel amount signals to said control circuit in response to a relationship between said inverting signal and said A-phase pulse signal; said waveform processing circuit comprising:
    a frequency dividing circuit for generating a pulse signal synchronous with the A-phase signal and having a duty ratio of 1:1; and,
    a control signal generation circuit for generating the traveling amount signal and the direction signal based on said pulse signal.

2. A waveform processing circuit for a pulse generator as set forth in claim 1,
    wherein said frequency dividing circuit comprises a trigger signal generation circuit for generating trigger signals in correspondence with both rise and fall edges of said A-phase pulse signal, a trigger signal mask circuit for producing masked trigger signals in correspondence with level of said B-phase pulse signal, and a flip-flop circuit for outputting a pulse signal on the basis of said masked trigger signals.

3. A waveform processing circuit for a pulse generator as set forth in claim 1,
    wherein the pulse signal outputted from said frequency dividing circuit has a period twice greater than that of said A-phase pulse signal.

4. A moving object control apparatus comprising:
    a pulse generator for outputting in accordance with movement of an object to be detected, an A-phase pulse signal and a B-phase pulse signal, said pulse signals having a same period and a phase difference therebetween;
    a control circuit adapted to receive input signals indicative of a travel direction and a travel amount of said object and to output a control signal including an inverting signal which is inverted when said travel amount signal is inputted;
    a waveform processing circuit provided between said pulse generator and said control circuit and generating said travel direction and travel amount signals to said control circuit in response to a relationship between said inverting signal and said A-phase pulse signal; said waveform processing circuit comprising:
    a frequency dividing circuit for generating a pulse signal synchronous with the A-phase signal and having a duty ratio of 1:1; and,
    a control signal generation circuit for generating the traveling amount signal and the direction signal based on said pulse signal.

* * * * *